Dec. 20, 1960 H. N. HOFFMAN 2,964,929
THRUST TRANSMITTING FLEXIBLE COUPLING
Filed Nov. 12, 1959
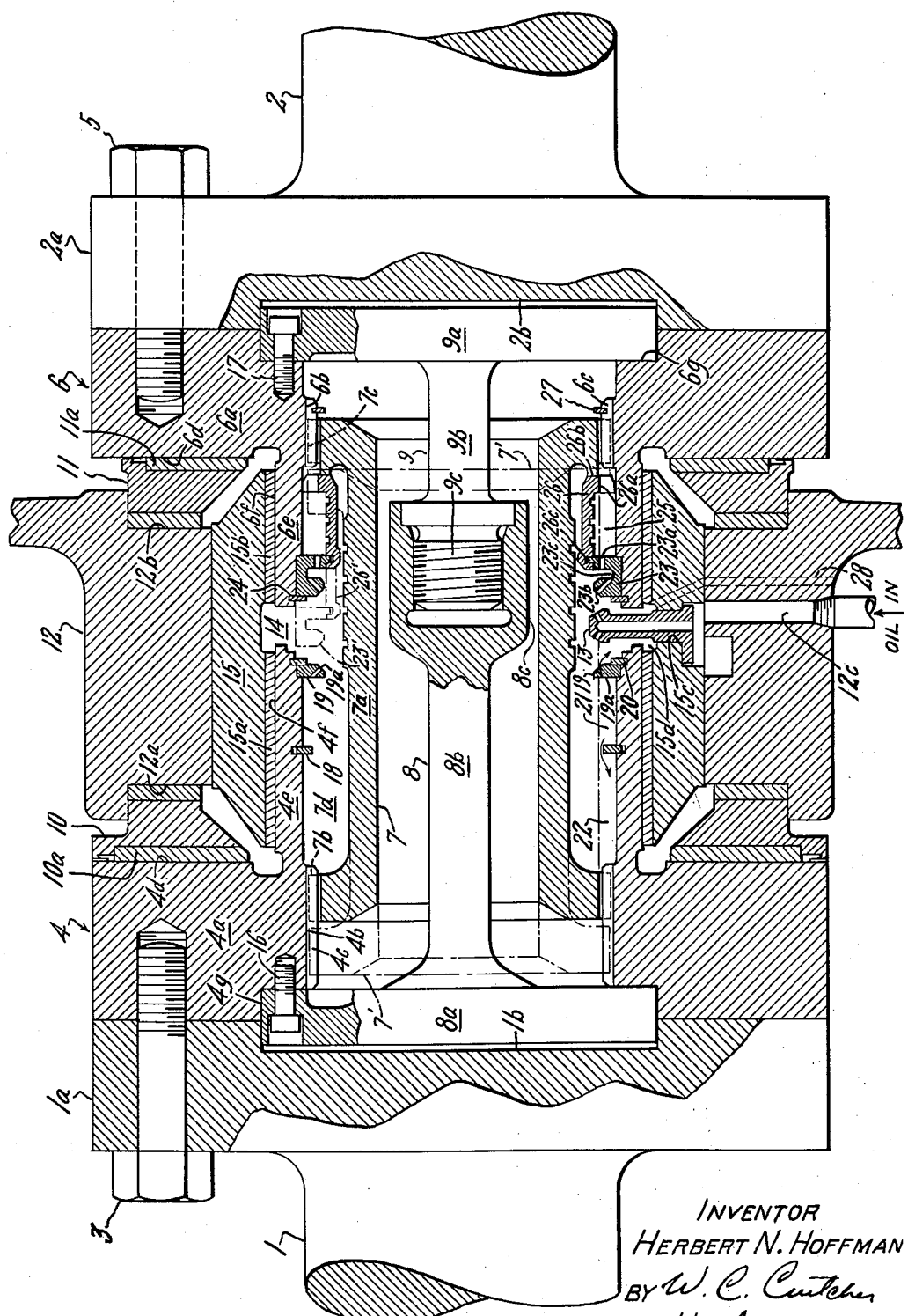
INVENTOR
HERBERT N. HOFFMAN
BY W. C. Crutcher
HIS ATTORNEY United States Patent Office 2,964,929
Patented Dec. 20, 1960

2,964,929

THRUST TRANSMITTING FLEXIBLE COUPLING

Herbert N. Hoffman, Worcester, Mass., assignor to General Electric Company, a corporation of New York Filed Nov. 12, 1959, Ser. No. 852,362

7 Claims. (Cl. 64—9)

This invention relates to an improved flexible coupling which is easily disassembled, and more particularly it relates to a flexible coupling which conveniently incorporates provisions for thrust and journal bearings at the immediate coupling location and in addition incorporates an improved lubricating arrangement which minimizes the possibility of clogging the working parts from accumulations of sludge in the lubricating oil. While not limited thereto, the flexible coupling of the invention is particularly useful for connecting turbine-generator sets for marine application, where size and weight must be kept to a minimum.

Wherever two rotating shafts must be coupled together and there is a possibility of continual misalignment during operation, flexible couplings are very desirable. The need is especially acute in marine applications where the movement of the hull is communicated to the casings of machinery attached thereto. An example is the shaft connection which must be made on a turbine-generator set which utilizes a steam turbine driving a generator to provide ship's service electricity, where the turbine and generator are made as separate units and then connected together.

The concept of separting the thrust-transmitting and torque-transmitting functions between two coupled shafts by employing a transversely flexible center thrust strut between shafts and a coaxial splined torque-transmitting member is disclosed in U.S. Patent No. 2,867,999 issued to H. N. Hoffman and S. P. Brickett on January 13, 1959, and assigned to the assignee of the present application. With the coupling shown in that patent, it is necessary to unbolt the thrust-transmitting strut from the shaft in order to disassemble the coupling.

If it is desired to utilize a coupling member having a journal portion thereon which is bolted to a shaft, the journal should be machined after the connection is made to insure absolute concentricity. In constructions where it is later necessary to unbolt the members it is difficult to re-achieve this concentricity, even when the same holes are used.

Another common difficulty encountered in splined connecting members, where there are internal teeth disposed in the bores of rotating members is the accumulation of an abrasive particle-carrying "sludge" between the teeth. Since the members are rapidly rotating, the heavier foreign particles in the oil tend to centrifuge toward the outside diameter. This causes a build-up of foreign matter between the teeth of the coupled members which reduces the clearance area and can cause the teeth to wear excessively or even to bind. Since free movement of the torque-transmitting member is essential in order for the flexible coupling to operate effectively, a means of avoiding the passage of foreign matter into the spline teeth is greatly to be desired.

Accordingly, one object of the present invention is to provide an improved thrust-transmitting flexible coupling for direct-connected shafts which also incorporates journal and thrust bearing arrangements in a compact form.

Another object is to provide a flexible coupling with separated thrust-transmitting and torque-transmitting members which provides for a main journal at the coupling location without requiring additional space.

Still another object is to provide a compact thrust-transmitting flexible coupling in which the coupled shafts can be disassembled without disturbing the carefully aligned coupling journal-to-shaft connections.

Another object is to disclose an improved lubricating arrangement for a flexible coupling.

A further object is to provide means for reducing the wear upon the spline teeth in a pair of spline-coupled shafts rotating at high velocity due to accumulated foreign matter in the lubricating oil.

Still another object is to reduce the space and weight requirements for direct-coupled machines to a minimum by combining into a single integrated structure a thrust bearing, a journal bearing, and a flexible coupling.

Other objects and advantages will be come apparent from the following description, taken in connection with the accompanying drawing, in which the single figure is a horizontal sectional view of a combination bearing and thrust-transmitting flexible coupling in accordance with the invention.

Generally stated, the invention is practiced by providing journal and thrust bearing means disposed around a flexible coupling assembly and between the end flange portions thereof. The journal means supports the coupling and holds the two halves of the coupling assembly in substantially coaxial relation. The coupling comprises a torque-transmitting splined sleeve with a separable thrust-transmitting strut disposed centrally therein. A special lubricating arrangement centrifugally separates sludge from the oil and removes it from the coupling.

Referring to Fig. 1 of the drawing, a driven shaft 1 having a heavy annular terminating flange 1a is coupled to a driving shaft 2 having a similar flange 2a. Shaft 1, as illustrated, is part of an electrical generator rotor (not shown) which is driven by a steam turbine (not shown) through shaft 2. Coaxially attached to the generator shaft flange 1a by cap screws, one of which is seen at 3, is a generator coupling member 4. Similarly attached to flange 2a by cap screws 5 is the turbine coupling member 6. The transmission of torque between shafts 1 and 2 is accomplished by the spline sleeve, shown generally at 7, and thrust transmission between shafts 1 and 2 is accomplished by the separable thrust struts 8, 9. A stationary bearing pedestal 12 is the main load-bearing member supporting suitable thrust bearing members 10, 11 and a two-part journal bearing member 15.

Turning now to the construction of coupling member 4, a relatively heavy disk portion 4a which is firmly bolted to flange 1a defines an internal cylindrical bore 4b and internal spline teeth 4c. The disk portion 4a also has a smooth annular thrust bearing surface 4d disposed normal to the shaft axis. Coupling member 4 also includes an axially extending journal portion 4e which has an outer bearing surface 4f.

The turbine coupling member 6 is similarly formed with a disk portion 6a, bore 6b, internal spline teeth 6c, thrust surfaces 6d, and a journal portion 6e with a bearing surface 6f. It will be noted that the respective journal portions 4e, 6e extend toward one another but are separated by a gap 14 which allows for slight shaft misalignment as permitted by the working clearances between the journal members 4e, 6e and the two-part bearing 15.

The thrust bearings 10, 11 may be of the "pivoted shoe" or other suitable type, and, as shown, are axially supported by surfaces 12a, 12b of pedestal 12 in a manner familiar to those skilled in the art. Thrust bearings 10, 11 carry bearing pads 10a, 11a which cooperate with thrust surfaces 4d, 6d to form a wedge-shaped oil film for resisting thrust of the rotating flanges in either direction.

The pedestal 12 also carries journal bearing 15 having bearing pads 15a, 15b which support journal portions 4e, 6e respectively. The bearing 15 may serve as the center bearing for the combined turbine-generator rotor where a three-bearing pedestal arrangement is used. In other words, shaft 1 would be supported by a first bearing in a pedestal on the opposite end of the generator (not shown), shaft 2 is supported by a second bearing in a pedestal on the opposite end of the turbine (not shown) and the pedestal 12 for bearing 15 acts as the third or common central bearing pedestal for the entire unit. Thus a very compact arrangement is achieved since the coupling assembly also provides both thrust bearing and journal bearing functions in minimum space.

It will be understood by those skilled in the art that the bearing members 10, 11, 15 may be either segmented or constructed in two halves so that they can be positioned or replaced while the coupled shafts are in position.

Spline sleeve 7 consists of a central cylindrical portion 7a radially spaced from the coupling journal portions 4e, 6e to define an annular chamber 7d therebetween. Spline sleeve 7 also has external spline teeth 7b, 7c at either end which mate with spline teeth 4c, 6c respectively on the coupling members. Radial clearance is provided between mating spline teeth so that spline sleeve 7 is free to slide axially and so that torque will be transmitted between the shafts by the spline sleeve 7 even though shaft 1 is "cocked" with respect to shaft 2. The spline sleeve 7 serves to halve the angle by which shaft 1 is displaced with respect to shaft 2, the total angular misalignment being thus divided into two substantially equal portions, taken care of by the respective end splines.

In order to transmit thrust between shafts 1 and 2, thrust struts 8, 9 are supplied. Thrust strut 8 has an annular flange 8a disposed in mating recesses 1b, 4g of the shaft and coupling flanges respectively and is secured to the coupling flange by screws, one of which may be seen at 16. A relatively slender rod portion 8b of thrust strut 8 extends along the shaft axis and terminates in an internally threaded socket portion 8c.

Similarly, thrust strut 9 has an annular flange 9a disposed in mating recesses 6g, 2b of the coupling and turbine flanges, a rod portion 9b, and an externally threaded stud portion 9c adapted to be screwed into the socket portion 8c of thrust strut 8. Thrust strut 9 is similarly bolted securely to the turbine coupling member 6 by screws 17. By this means, rotation of shaft 1 while shaft 2 is held fast, will screw together or unscrew the struts 8, 9, provided the spline sleeve 7 is not engaged.

Thus a "solid" thrust-transmitting connection is afforded between shafts 1 and 2. It should be noted, however, that the rod portions 8b, 9b are relatively slender so that they may flex transversely when generator flange 1a "cocks" with respect to turbine flange 2a while the shafts are rotating. It is to be understood that the separation of the thrust-transmitting and torque-transmitting functions by this use of a transversely flexible thrust shaft and a spline sleeve is not claimed to be new in itself, the concept being disclosed in the aforementioned Hoffman-Brickett patent. The present invention is an improvement over the Hoffman-Brickett coupling which employed separate thrust and journal bearing provisions.

The lubricating system which greatly reduces sludge formation between the spline teeth will now be described. The oil injection nozzle 13 is mounted in a hole 15c in the bearing block 15 and receives a supply of oil through a conduit 12c in the pedestal 12 from a source of lubricant under pressure (not shown). The centrifuging and sludge removal arrangement is slightly different on the generator side of the coupling from that on the turbine side. The unit on the generator side will be described first although it should be understood that its principle of operation is essentially the same as that on the turbine side. A ring 18 is disposed in an annular recess in the interior wall of the journal portion 4e of the generator coupling member 4. The inside diameter of ring 18 is such that it is slightly below the oil level when the coupling is rotating, it being understood that the oil level is held at substantially the same radial thickness around the inside walls of the coupling members due to centrifugal force. A sludge removal ring 19 is secured in place by a split retaining ring 20. It is to be particularly noted that sludge removal ring 19 has an inner diameter above the oil level, and has a number of circumferentially distributed bleed ports 19a cut therein so as to slant diagonally inward from a point on the side nearest ring 18 to a point of lesser radius on the side nearest oil nozzle 13. The openings of bleed holes 19a in ring 19 on the side nearest ring 18 are located at a greater radius than the inner radius of 18 and the bleed hole openings in ring 19 on the side removed from ring 18 are at a lesser radius than the inner radius of ring 18. The radial location of these bleed hole openings in ring 19 on the side removed from 18, determine the height of oil maintained in this coupling area when the coupling is rotating. Rings 18 and 19 define an "oil centrifuging and sludge collecting" chamber 21 between them. A "clean oil chamber" 22 is defined on the opposite side of ring 18 from the sludge collection chamber 21.

With the coupling rotating, oil is fed into chamber 21 by oil nozzle 13. This oil is rotated by the coupling and the heavier sludge forming contaminants are, by centrifugal action, forced to the outer radius of this chamber. The oil level in this chamber is maintained by the bleed holes 19a which continually bleed off oil to maintain the level at the radial location of their exit side and since there is a constant flow of oil through these holes, they function to emit any sludge which tends to build up above their entrance side in sludge chamber 21. Any oil flowing over inner radius of ring 18 into "clean oil chamber" 22 which also surrounds coupling gear teeth will be clean centrifuged oil.

Turning now to the construction on the turbine end, a special oil ring 23, held in place by a retaining ring 24, combines the functions of the two previously described rings 18, 19. Clean oil supply ports 23a lying below the operating oil level admit oil to a clean oil supply chamber 25. Ring 23 also defines sludge removal ports 23b which are carefully slanted in the same manner as described for ports 19a in ring 19. These bleed ports 23b have their opening on the side towards sludge collecting chamber 23c located at a larger radius than clean oil supply ports 23a and their openings on the opposite side located at a lesser radius than clean oil supply ports 23a. A carefully contoured sludge pocket 23c in ring 23 provides an "oil centrifuging and sludge collection" chamber similar to chamber 22 on the generator end. In order to prevent the incoming oil from bypassing the ring 23, a spacer ring 26 having axial slots 26a is held coaxial with the turbine coupling half 6 by a groove 26c mating with oil ring 23 in a manner which will be obvious from the drawing. Spacer ring 26 also serves to prevent the disengagement of the spline sleeve 7 by limiting its movement between an abutment surface 26b and a stop ring 27 disposed in spline teeth 6c.

The removal of excess oil from the coupling assembly is accomplished through an annular groove 15d in the bearing block and a discharge conduit 28.

First the operation and method of assembly of my improved thrust-transmitting flexible coupling will be described and then the operation of the spline lubricating system will be outlined. The operation of this coupling under thrust is interesting in a number of ways. First, it will be appreciated that in the case of shipboard-installed units, shafts 1 and 2 would normally be disposed to shift axially under their own weight due to the mere movement of the ship. Assume, for example, that the ship moves so the turbine is higher than the generator. The weight of the turbine-generator rotor now produces an axial force component to the left, which will be borne by thrust bearing 11. Since the shafts 1, 2 are directly coupled by the thrust members 8, 9, the axial force component of the generator rotor weight will be borne by members 8, 9 in tension. This action occurs in a similar manner but in the opposite direction when the turbine is lower than the generator.

It will be appreciated, of course, that a constant operating thrust may be imposed upon either set of shoes 10, 11 due to the aerodynamic thrust reaction to the steam passing the buckets. There may likewise be thrust force emanating from the generator end due to the so-called electrical "solenoid action" of the generator rotor within the armature coils. Thus there can be momentary periods where shafts 1 and 2 generate opposing axial thrust forces. In such a case, if both thrust forces are towards the center bearing pedestal, thrust rods 8, 9 will carry the smaller force internally in compression with the difference between these forces, of course, being carried by thrust bearings 10 or 11 depending upon the direction of the net axial force. In cases where both thrust forces are away from the center pedestal, thrust rods 8, 9 will carry the largest of these forces in tension.

There are other conceivable situations where the thrust forces are in the same direction rather than in opposite directions. In such cases, the thrust bearings 10, 11 carry the sum rather than the difference of the two forces. As for the thrust rods 8, 9, they will carry the largest force in tension if the largest force is directed away from the pedestal and they will carry the smallest force in tension if the largest force is toward the pedestal.

The foregoing will be apparent to those skilled in the art by an analysis of the forces. It is to be particularly noted that in three out of the four possible situations, the thrust rods 8, 9 are in tension which is more desirable since the problem of "buckling" is not introduced. In the only situation where members 8, 9 are in compression, they need carry only the smaller of the axial forces. Thus the combination of the thrust bearings 10, 11 with this type of coupling is particularly effective where a slender transversely flexible thrust member is used to connect the shafts.

It may be noted at this point that the degree of misalignment tolerated by this design will not cause mechanical interference between journals 4e, 6e and the respective bearing pads 15a, 15b, by reason of the small but significant clearances provided between journal and bearing. It will, of course, be observed that angular misalignment of either of these journal portions would, if carried to an extreme, cause binding between opposite ends of the corresponding pad at diametrically opposed locations. Accordingly, the thickness of the oil film supporting journals 4f, 6f must be sufficient to permit the degree of misalignment anticipated in operation. Therefore, misalignment will merely reduce the thickness of this oil film without proceeding to the point where binding or grabbing with possible "wiping" of the Babbitt from the pad would occur. In the drawings the thrust and journal bearings have all been shown, in accordance with conventional drafting practice, without the clearance spaces occupied by the oil films.

The assembly of the flexible coupling, which allows the coupling journal-to-shaft attachment represented by screws 16, 17 and cap screws 3, 5 to remain intact once established, is outlined as follows. It will be understood that an initial careful alignment is made when attaching thrust members 8, 9 to the coupling members 4, 6 respectively by screws 16, 17. Concentricity and parallel disposition of shafts 1 and 2 are established after the generator and turbine units are installed and the holes for screws 17 are drilled during this alignment. Likewise, the coupling members 4, 6 are attached to shaft flanges 1a, 2a by cap screws 3, 5. Once these connections have been made it is no longer necessary to disturb them, due to the novel manner of connecting the coupling members.

One of the major advantages in this coupling is that the journal sections can be bolted to the turbine and generator shafts, can be machined and honed in place so that they are concentric with the shafts within very close limits, and need never be unbolted even though rotors are uncoupled and disassembled from units and replaced.

The following procedure is used in coupling together the turbine and generator shaft assemblies, the generator shaft assembly consisting of members 1, 3, 4, 8 and 16, the turbine shaft assembly consisting of members 2, 5, 6, 9 and 17. Spline sleeve 7 is inserted in the generator coupling member 4 and moved as far as possible toward the generator, utilizing the extra length of spine teeth 4c for this purpose. Sleeve 7 is thus shown by the phantom lines 7', it being understood that the entire generator rotor 1 is also shifted to the left from the position shown in the drawing by virtue of the additional length of the journal bearing pad 15a. Rings 18, 19 and retaining ring 20 are then assembled in place and spacer ring 26 is inserted into portion 4e as far as ring 19 will permit. The generator rotor 1 is then moved axially to the right to a position where the threads of thrust members 8, 9 begin to engage. The turbine rotor is locked to prevent its rotation. It will be noted that at this point, the spline teeth 6c, 7c on the turbine end are not engaged. The generator rotor 1 is then rotated so that the threads on stud portion 9c will be screwed into socket 8c thus fastening the shafts together.

Spacer ring 26 is then moved towards shaft 2 and split oil ring 23 is inserted through the space 14 into spacer ring groove 26c. The phantom lines 23', 26' show the portions of oil ring 23 and spacer ring 26 during assembly. Then the rings 23, 26 are moved axailly until they engage with the spline sleeve 7 at 26b. Further axial movement of the lubrication assembly moves the spline sleeve teeth 7c into engagement with the mating teeth 6c and retaining ring 24 is positioned. The shafts 1 and 2 are now torsionally locked together as well as axially locked.

It will be seen from the foregoing that, in the event it is desired to disassemble the turbine shaft 2 from the generator shaft 1, it is not necessary to break the carefully aligned coupling-to-shaft connections consisting of screws 16, 17 holding the thrust struts 8, 9 in place and screws 3, 5 holding the coupling members 4, 6 in place.

Disassembly proceeds in the reverse manner from the described assembly procedure. It is merely necessary to remove retaining ring 24 and the oil ring 23, slide spacer ring 26 toward the generator so that spline sleeve 7 can be moved toward the generator, so as to free the shafts to turn with respect to one another. Then the thrust rods 8, 9 can be unscrewed, and, after further axial movement of the generator rotor, the two rotors are separated. This affords an extremely useful arrangement for coupling the two shafts so that the connection can be broken without disturbing the carefully achieved alignment of the coupling journal-to-shaft connections.

The lubricating system functions as follows. Oil entering through nozzle 13 is sprayed onto the spline sleeve 7 and is immediately thrown off by centrifugal force into the collecting chamber 21 between rings 18, 19 and the sludge pocket 23c between the radial walls of ring 23. Here a centrifuging action takes place while the oil is held against the interior walls of the coupling members 4, 6 by centrifugal force as indicated by the oil level line shown in the drawing. The foreign particles and sludge in the oil cling to the radially outermost parts of chamber 21 and the pocket 23c. On the side toward the generator, clean oil, being less dense than the sludge, flows over the inner periphery of ring 18, which acts as a "dam" to prevent the sludge from drifting toward spline teeth 4c, 7b. This clean oil flow to the spline teeth is indicated by the arrow above ring 18. The oil level is determined by the sludge removal port 19a, excess oil bleeding out through port 19a as indicated by the arrow. From there, the excess oil flows to the groove 15d and drain conduit 28. It will be noted that the movement of the clean oil over the top of the "dam" 18 is very slow as compared with the movement through sludge removal ports 19a since excess oil is constantly bled from the ports 19a. It is also to be noted that the ports 19a are slanted so as to open into chamber 21 at a greater radius than the side toward the nozzle 13. Hence, the rapid flow of oil being bled through ports 19a will entrain the denser sludge in the outer periphery of chamber 22 and carry it out ports 19a to the drain conduit 28. The slanting of the ports 19a provides a smooth flow path for the sludge and bleed oil. Constant removal of the denser foreign particles thus takes place through the sloping ports 19a as fresh oil is added, whereas the less dense clean oil flows over the edge of ring 18 to the spline teeth.

A similar action takes place on the turbine side of the coupling. The oil entering through nozzle 13 is prevented from flying directly off the spline sleeve 7 toward the spline teeth by the spacer ring 26. Its only point of entry to the spline teeth is through ports 23a and from there through slots 26a in spacer ring 26. To this end, ports 23a function in the same manner as the ring 18 to form a "dam" for preventing the flow of the heavier sludge portion of the oil to spline teeth 6c, 7c. It will be noted that the radially outermost parts of ports 23a lie below the oil level.

Conversely, sludge removal ports 23b are slanted similar to ports 19a with the side of the ports toward the nozzle determining the oil level as will be obvious from the drawing. The other end of ports 23b blend smoothly into the pocket 23c where the denser sludge is collected. Therefore, the oil which is bled from ports 23b carries along with it the accumulated matter in pocket 23c to constantly remove it and allow clean oil to flow through ports 23a.

Thus it will be seen that an extremely compact and efficient flexible coupling is provided which utilizes a minimum of space to effectively transmit torque and thrust between two shafts where the rotating shafts are subject to varying forces including thrust and various misaligning influences. The coupling may be disassembled without disturbing the coupling journal-to-shaft connections and re-assembled without fear of destroying the carefully established concentricity of the journals with the shafts. The novel lubricating system prevents sludge build-up in the torque-transmitting spline teeth by centrifuging the sludge between radial retaining walls and effectively removing it.

While there has been described what is at present considered to be the preferred embodiment of the invention, it will be understood that still other modifications may be made, and it is intended to cover in the appended claims all such modifications as fall within the true spirit and scope of this invention.

What I claim as new and desire to secure by Letters Patent of the United States is:

1. A close-coupled rotor assembly comprising first and second rotors substantially axially aligned and having first and second axially spaced end flange portions defining first and second annular bearing surfaces thereon normal to the axis of rotation, bearing means rotatably journaling said rotors, axially slidable means disposed radially inward from said bearing surfaces and connecting the end flange portions for transmitting torque from the first rotor to the second rotor, thrust-transmitting means connecting the first and second flange portions along the rotor axis to maintain the axial spacing between the first and second rotors, and thrust bearing means disposed radially outward of the torque-transmitting means and cooperating with the first and second annular bearing surfaces to limit the axial movement of the first and second rotors, whereby the first and second rotors may become angularly misaligned without axial movement.

2. A close-coupled rotor assembly comprising first and second rotors substantially axially aligned and having first and second axially spaced end flange portions defining opposed first and second annular bearing surfaces thereon normal to the axis of rotation, said first and second end flange portions also defining first and second axially projecting hollow journal portions respectively on the side of the end flange portions opposite the rotors proper, journal bearing means rotatably journaling said rotors by said journal portions, axially slidable means disposed coaxially inside said hollow journal portions and connecting the end flange portions for transmitting torque from the first rotor to the second rotor, a transversely flexible rotatably separable thrust-transmitting member connecting the first and second flange portions along the rotor axis to maintain the axial spacing therebetween, and thrust bearing means disposed radially outward of the torque-transmitting means and between the first and second annular bearing surfaces to cooperate therewith to limit the axial movement of the first and second rotors.

3. A close-coupled rotor assembly comprising a first rotor having a first end flange portion, a second coaxial rotor having a second end flange portion adjacent and axially spaced from said first end flange portion, said first and second rotors being rotatably journaled at the rotor ends opposite the flange portions, first and second coupling members defining opposed first and second annular bearing surfaces respectively normal to the rotor axis, said first and second coupling members being secured to the first and second flange portions respectively, the first and second coupling members also including first and second axially extending hollow journal portion respectively, axially slidable torque-transmitting means coaxially disposed inside said hollow journal portions and connecting the first and second coupling members for transmitting torque from the first rotor to the second rotor, a transversely flexible rotatably separable thrust-transmitting member connecting the first and second coupling members along the rotor axis to maintain the axial spacing therebetween, whereby the first and second rotors can first be coupled for thrust-transmission by rotatably connecting the thrust-transmitting member and secondly coupled for torque-transmission by axial movement of the torque-transmitting member, journal bearing means disposed between the first and second end flange portions and rotatably journaling the first and second journal portions of the coupling members, thrust bearing means disposed radially outward of the spline sleeve and between the first and second annular bearing surfaces of the coupling members to cooperate therewith to limit the axial movement of the first and second rotors.

4. A close-coupled rotor assembly comprising a first rotor having a first end flange portion, a second coaxial rotor having a second end flange portion adjacent and axially spaced from said first end flange portion, said first and second rotors being rotatably journaled at the rotor ends opposite the flange portions, first and second coupling members defining opposed first and second annular bearing surfaces respectively normal to the rotor axis, said first and second coupling members being secured to the first and second flange portions respectively, the first and second coupling members also including first and second axially extending hollow journal portions respectively, axially slidable torque-transmitting means coaxially disposed inside said hollow journal portions and connecting the first and second coupling members for transmitting torque from the first rotor to the second rotor, a flexible thrust-transmitting member including a first rod portion exending axially from the first flange portion and terminating in a threaded socket intermediate the first and second flange portions, and a second rod portion extending axially from the second flange portion and terminating in a threaded stud portion, whereby the first and second rotors can be coupled for thrust-transmission by rotatably engaging the socket and stud portions of the strut member and coupled for torque-transmission by axial movement of the torque-transmitting means, journal bearing means disposed between the first and second end flange portions and rotatably journaling the first and second journal portions of the coupling members, and thrust bearing means disposed radially outward of the journal bearing means and between the annular bearing surfaces of the coupling members to cooperate therewith to limit the axial movement of the first and second rotors.

5. A close-coupled rotor assembly comprising a first rotor having a first end flange portion, a second coaxial rotor having a second end flange portion adjacent and axially spaced from said first end flange portion, said first and second rotors being rotatably journaled at the rotor ends opposite the flange portions, first and second coupling members each defining opposed first and second annular bearing surfaces respectively normal to the rotor axis and having annular portions defining central bores coaxial with the rotor axis and including internal spline teeth, said first and second annular portions being secured to the first and second flange portions respectively, the first and second coupling members also including axially extending hollow journal portions, a spline sleeve inside the journal portions with end portions disposed substantially coaxial with and adjacent said first and second coupling annular portions with external spline teeth engaging the teeth of the annular portions for transmitting torque between rotors, a flexible thrust-transmitting member including a first rod portion extending axially from the first flange portion and terminating in a threaded socket intermediate the first and second flange portions, and a second rod portion extending axially from the second flange portion and terminating in a threaded stud portion, whereby the first and second rotors can be coupled for thrust-transmission by rotatably engaging the socket and stud portions of the strut member and coupled for torque transmission by axial movement of the spline sleeve, journal bearing means disposed between the first and second end flange portion and rotatably journaling the first and second journal portions of the coupling members, and thrust bearing means disposed radially outward of the spline sleeve and between said annular bearing surfaces of the coupling members to cooperate therewith to limit the axial movement of the first and second rotors.

6. A lubrication system for a flexibly coupled rotor assembly comprising first and second rotors substantially axially aligned and having first and second axially spaced end flange portions, said end flange portions defining central bores with internal spline teeth and also defining first and second axially spaced hollow cylindrical portions connecting at one end with said spline bores, bearing means rotatably journaling said rotors, a spline sleeve with end portions disposed substantially coaxial with and adjacent said first and second end flange portions with external spline teeth engaging the internal teeth of the end flange portions for transmitting torque between rotors, thrust means axially spacing said first and second rotors, means for introducing lubricant through the space between the first and second cylindrical portions to the interior walls of the cylindrical portions, first means to restrict the flow of the denser portion of the lubricant toward the spline teeth including a first annular radial wall extending inward from each of the cylindrical portions, second means defining together with said first wall an annular lubricant centrifuging chamber, said second means including a second annular radial wall defining sludge removal ports extending therethrough and slanting from a greater diameter on the centrifuging chamber side to a lesser diameter on the opposite side of the wall, whereby said sludge ports in the second wall determine an oil level while the coupling is rotating which allows the oil to flow over the top of the first wall toward the spline teeth and whereby excess oil bled through the sludge ports will entrain sludge from the centrifuging chamber.

7. A lubrication system for a flexibly coupled rotor assembly comprising first and second rotors substantially axially aligned and having first and second axially spaced end flange portions, said end flange portions defining central bores with internal spline teeth and also defining first and second axially spaced hollow cylindrical portions connecting at one end with said spline bores, bearing means rotatably journaling said rotors, a spline sleeve with end portions disposed substantially coaxial with and adjacent said first and second end flange portions with external spline teeth engaging the internal teeth of the end flange portions for transmitting torque between rotors, thrust means axially spacing said first and second rotors, nozzle means projecting between the spaced ends of said cylindrical portions to introduce lubricant to the interior walls of the cylindrical portions, first means to restrict the flow of the denser portion of the lubricant toward the spline teeth including a first annular radial wall extending inward from each of the cylindrical portions, second means defining together with said first wall an annular lubricant centrifuging chamber on the side of the first wall opposite the spline teeth, said second means including a second annular radial wall defining sludge removal ports extending therethrough and opening into the centrifuging chamber at a diameter greater than the diameter of the top of the first wall and opening on the opposite side at a diameter less than the diameter of the top of the first wall to determine an oil level when the coupling is rotating which is higher than the top of the first wall, whereby clean oil will flow over the first wall to lubricate the spline teeth and excess oil introduced by the nozzle means will bleed from the centrifuging chamber through the sludge ports and entrain centrifuged sludge therein.

References Cited in the file of this patent

UNITED STATES PATENTS

| | | |
|---|---|---|
| 1,616,034 | Fast | Feb. 1, 1927 |
| 1,770,743 | Morgan | July 15, 1930 |
| 2,565,558 | Highberg | Aug. 28, 1951 |
| 2,712,740 | Boyd | July 12, 1955 |
| 2,726,523 | Zrodowski | Dec. 13, 1955 |
| 2,867,999 | Hoffman et al. | Jan. 13, 1959 |